June 22, 1954 E. J. POLLEY 2,681,634

CHANNEL INDICATOR FOR TELEVISIONS

Filed Dec. 12, 1952

EUGENE J. POLLEY
INVENTOR.

BY Francis W. Crotty

HIS ATTORNEY.

Patented June 22, 1954

2,681,634

UNITED STATES PATENT OFFICE 2,681,634

CHANNEL INDICATOR FOR TELEVISIONS

Eugene J. Polley, Lombard, Ill., assignor to Zenith Radio Corporation, a corporation of Illinois Application December 12, 1952, Serial No. 325,596

6 Claims. (Cl. 116—124.4)

This invention pertains to a frequency-channel indicator for a wave-signal receiver and is particularly concerned with an indicator which presents a relatively large visual indication of the frequency to which the receiver is tuned. The indicator is especially valuable when employed in conjunction with a television receiver and will be described in that connection.

At the present time, most television receivers are conditioned for the reception of video signals by means of a tuning device actuated by one or more tuning knobs. The original allocations of frequency bands or channels limited the portion of the spectrum available for television broadcasting to twelve channels distributed in two separated sections of what has come to be known as the Very High Frequency band, extending from 54 to 216 megacycles per second. Consequently, the control knob for most television receivers is provided with a series of peripheral indicia which, in conjunction with a stationary marker, indicate the channel to which the receiver is tuned. Space limitations on knobs of this type preclude the use of numerals or other indicia of relatively large size; in practice, the markings are generally restricted to numerals one-quarter inch or less in height. However, complete utilization of the entertainment value of a television broadcast, as reproduced by modern large-screen receivers, requires that the observer be stationed a considerable distance from the image screen, usually eight to ten feet or more. At such a distance, it becomes exceedingly difficult to read the knob markings to ascertain the frequency-channel to which the receiver is attuned.

The allocation of an additional 69 channels for television broadcasting purposes, located in an entirely different portion of the frequency spectrum, between 480 and 890 mcs., has further complicated matters by increasing the number of possible markings from 12 to 81. Furthermore, with those tuning devices of the type known to the art as turret tuners, it is possible that adjustment of the control knob of the tuning device from channel to channel may be totally unrelated to the normal sequence of the channel numbers, so that a single fixed indicator marking system is both cumbersome and difficult to read.

It is an object of this invention to provide an improved frequency-channel indicator for a wave-signal receiver which presents a visual indication of the frequency-receptive conditioning of the receiver and which is considerably larger than that of the prior art arrangements.

It is a further object of this invention to provide a frequency-channel indicator including provision for rapid and expedient alteration of the sequence and positioning of its primary indicating elements.

It is a corollary object of this invention to provide a frequency-channel indicator for a television receiver which is readily visible even in a darkened room and which can be seen from a considerable distance.

It is a corollary object of this invention to provide a frequency-channel indicator for a wave-signal receiver which is simple and expedient to assemble and economical to manufacture.

A frequency-channel indicator for a wave-signal receiver including a cabinet and a frequency-selective tuning device comprises, in accordance with the invention, a tuning knob including a hollow, substantially cylindrical body section. A first end-closure section is affixed to one end of the body section and includes a translucent screen area. A second end-closure section is affixed to another end of the body section and includes a plurality of light transparent portions arranged in a predetermined pattern about the central axis thereof. Each of the transparent portions is individually shaped to designate a particular wave-signal frequency-channel corresponding to a given operating condition of the tuning device. The indicator further includes means for mechanically linking the tuning knob to the tuning device to effect adjustment of the tuning device in response to rotation of the knob. A light source is also incorporated in the indicator and is mounted within the receiver cabinet and is positioned to project light through a selected one of the light transparent portions to form an image thereof on the translucent screen area.

The features of the invention which are believed to be novel are set forth with particularity in the appended claims. The organization and manner of the operation of the invention itself, together with further objects and advantages thereof, may best be understood by reference to the following description taken in conjunction with the accompanying drawing, in which:

Figure 1:
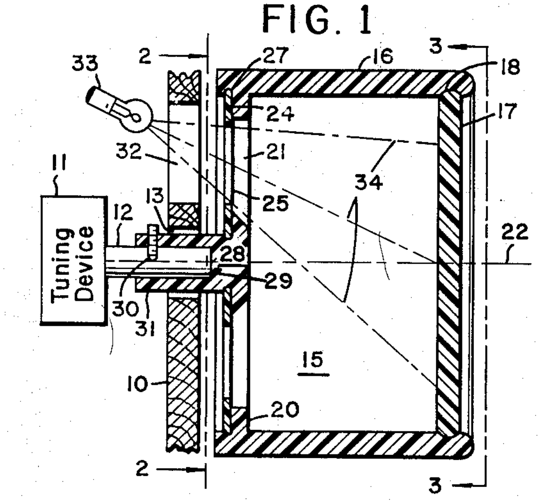
Figure 1 is a cross-sectional view, partially schematic, of one embodiment of the invention.

The frequency-channel indicator illustrated in Figure 1 is mounted on the cabinet of a wave-signal receiver; only a small portion of one wall 10 of the cabinet is shown. Inasmuch as the invention itself is not concerned with the operative electrical circuits of the receiver, most of these have been omitted from the drawing. The receiver includes a tuning device 11 which may be of any suitable type such as a turret tuner, a continuous tuner, or a detented or preset continuous tuner, all of which are in common use in the television field. A mechanical linkage means is connected to the tuning device to permit control of its operation from a position external to the cabinet. In the embodiment shown, this mechanical linkage is provided by a shaft 12 extending at least partially through an opening 13 in cabinet wall 10. All of the above-noted elements may assume any of the various forms known in the art without affecting the operation or utility of the channel indicator.

The indicator itself includes a tuning knob 15 comprising a hollow substantially circular body section 16 which may be formed from a molded resinous plastic material, Lucite, or any other suitable material. The term cylindrical, as used throughout this specification and in the appended claims, refers primarily to any geometrical configuration substantially symmetrical with respect to a central axis, and is intended to include structures which, in cross section, appear as squares, hexagons, or other polygons as well as the circular sections illustrated. A first closure section 17 is affixed to one end of cylinder 16 by any desired means; in the embodiment shown, section 17 is snapped into an annular groove 18 formed in the cylinder wall. At least a portion of section 17 must be translucent in nature, as will be more completely explained hereinafter; preferably, the complete section is formed from a translucent material, such as rough-finished or stippled Lucite, and thus defines a translucent screen area. A wall 20 closes the end of cylinder 16 opposite section 17, and, in part, may be formed integrally with the cylinder wall as shown. Wall 20 includes a plurality of light-transparent portions, here shown as apertures 21, arranged in an annular pattern about the central axis 22 of cylinder 16. If preferred, apertures 21 may be replaced by a substantially continuous transparent section centered about axis 22.

Figure 2:
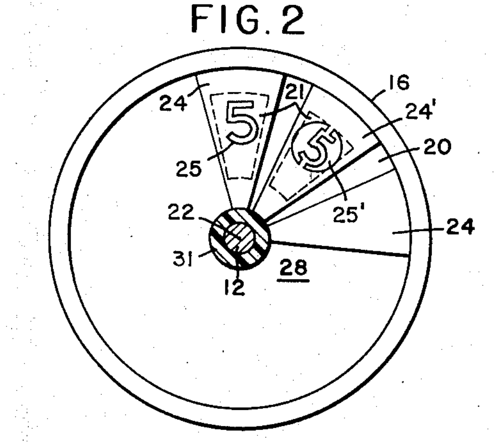
Figure 2 is a sectional view of the apparatus of Figure 1 taken along line 2—2.

As more clearly seen in Figure 2, a plurality of masking elements 24 are replaceably mounted adjacent to wall 20 and are arranged in a predetermined pattern about axis 22. Each of the masking elements includes a light transparent portion or area 25 individually shaped or otherwise bearing indicia to designate a particular wave-signal frequency-channel corresponding to a given operating condition of tuning device 11; in the embodiment shown, channel five of the V. H. F. television band is illustrated. An alternative form for masking element 24 is indicated by element 24′, in which the transparent and opaque parts of the indicia portion are transposed and are shown as area 25′. It will be apparent that elements 24 may be replaced by a single masking element or ring incorporating a plurality of individually shaped transparent areas such as portion 25 arranged in a predetermined pattern about axis 22. Masking elements 24 may be formed from any suitable opaque material with light transparent areas 25 cut away, or, if preferred, may be produced by photographic or printing processes. The masking elements are affixed to wall 20 in any suitable manner as by adhesive fixation to the wall, frictional coupling to cylinder 16, or, as shown, by snapping into an annular groove 27 formed at the external junction of wall 20 and cylinder 16 (Figure 1). Wall 20 and masking elements 24, considered as a unit, form a second closure section 28 for tuning knob 15.

The central portion 31 of wall 20 extends through opening 13 in cabinet wall 10 and is provided with a recess 29 to permit a mechanical connection between knob 15 and shaft 12. A rigid mechanical connection may be assured by use of any suitable means, such as set screw 30. Cabinet wall 10 is provided with a second opening 32 which, for the embodiment under consideration, is in general alignment with one of the openings 25 in the masking element. A light source 33 is mounted within the cabinet behind opening 32 and is coupled to a suitable source of electrical energy, not shown. In this embodiment, source 33 is a substantially single-point light source such as a prefocused flashlight bulb or a relatively small light bulb of any type which has a filament sufficiently small to simulate a single point.

Figure 3:
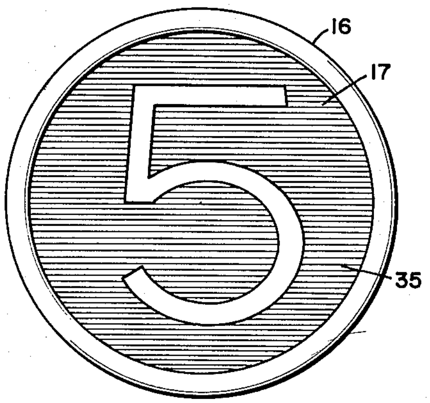
Figure 3 is a front view of the channel indicator of Figure 1 taken along line 3—3.

In operation, adjustment of tuning device 11 to condition the wave-signal receiver to a particular frequency-channel is effected by rotation of knob 15, which in turn causes rotation of shaft 12 and varies the setting of the tuning device. For the particular operating condition illustrated the receiver is assumed to be tuned to television channel five. Light from source 33, indicated by dash lines 34, is projected through cabinet opening 32 and transparent area 25 and impinges upon the translucent screen formed by closure section 17. As a result, an image having a shape corresponding to that of channel designation area 25 is formed on the screen and, to an observer, knob 15 presents the appearance shown in Figure 3. As seen therein, a large luminous figure five is seen against a dark or substantially unilluminated background area 35. It is preferred that this image fill most of the area of screen 17, which, in the normal instance, will be at least one inch in diameter. The image thus formed is readily recognizable by an average observer at a considerable distance and is clearly cognizable at the normal distances separating an observer from a television receiver. In addition, the lighted or luminous nature of the indication serves to make it readable even though the surrounding room area may be darkened.

Figure 4:
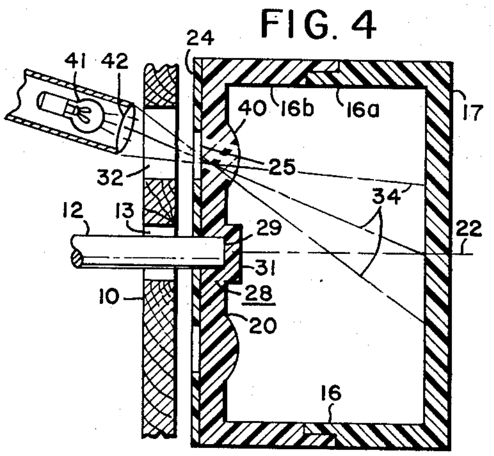
Figure 4 is a sectional view, partially schematic, of another embodiment of the invention.

The embodiment illustrated in Figure 4 is in most respects similar to that of Figure 1. Here, body section 16 is formed in two parts, 16*a* and 16*b*. Cylinder part 16*a* is formed integrally with closure section 17 and is preferably made from rough-finished Lucite or some similar translucent material. Part 16*b* is formed as an integral portion of closure wall 20 and is also, in the preferable form, made from a material such as Lucite. In this embodiment, apertures 21 are replaced by a plurality of convex lenses 40 which may be molded and finished as an integral part of wall 20. In addition, light source 33 is replaced by an unfocused light source 41 and a converging lens 42 interposed between the light source and masking element 24.

The operation of the embodiment of Figure 4 is substantially identical with that of Figure 1 in all major respects. Light emanating from source 41 is converged by lens 42 and is passed through opening 32, transparent portion 25, and lens 40 to impinge upon screen 17. After the light traverses indicia area 25 it is directed by lens 40 to cover a substantial portion of the screen area. Use of lenses 40 and 42 provides for more precise control of the definition of the outlines of the image formed on screen 17 and also permits use of an unfocused light source.

Figure 5:
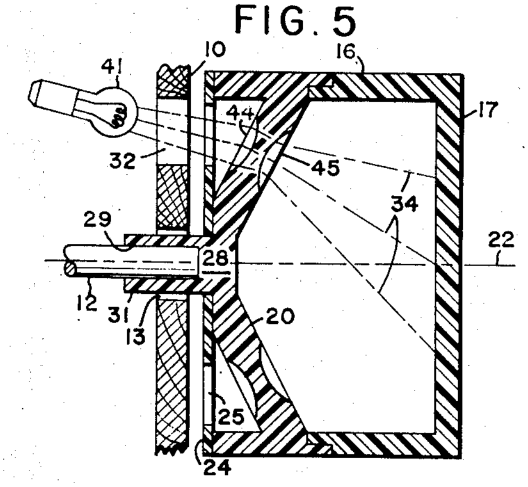
Figure 5 is a sectional view, partially schematic, of an additional embodiment of the invention.

The embodiment of Figure 5 is also quite similar in most respects to the indicators shown in Figures 1 and 4. In this embodiment, divergence of the light emanating from source 41 is accomplished by a pair of concave lenses 44 and 45; as in Figure 4, these lenses are preferably formed as an integral part of wall 20. Insofar as the effect upon an observer is concerned, this embodiment is virtually identical with those of Figures 1 and 4.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section affixed to the opposite end of said body section and including a plurality of light transparent portions arranged in a predetermined pattern about the central axis of said body section, each of said portions being individually shaped to designate a particular wave-signal frequency-channel corresponding to a given operating condition of said tuning device; means for mechanically linking said tuning knob to said tuning device to effect adjustment of said tuning device in response to rotation of said knob; and a light source mounted within said cabinet and positioned to project light through a selected one of said light transparent portions to form an image thereof on said translucent screen area.

2. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section affixed to the opposite end of said body section and including a plurality of light transparent portions arranged in a predetermined pattern about the central axis of said body section, each of said portions being individually shaped to designate a particular wave-signal frequency-channel corresponding to a given operating condition of said tuning device; means for mechanically linking said tuning knob to said tuning device to effect adjustment of said tuning device in response to rotation of said knob; and a substantially single-point light source mounted within said cabinet and positioned to project light through a selected one of said light transparent portions to form an image thereof on said translucent screen area.

3. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section, affixed to the opposite end of said body section, comprising a light transparent area substantially encircling the central axis of said body section and a masking element including a plurality of light-transparent portions arranged in a predetermined pattern about said central axis, said portions being individually shaped to designate a particular wave-signal frequency-channel corresponding to a given operating condition of said tuning device; means for mechanically linking said tuning knob to said tuning device to effect adjustment of said tuning device in response to rotation of said knob; and a light source mounted within said cabinet and positioned to project light through a selected one of said light transparent portions to form an image thereof on said translucent screen area.

4. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section, affixed to the opposite end of said body section, comprising a light transparent area substantially encircling the central axis of said body section and a plurality of masking elements arranged in a predetermined pattern about said central axis, each of said masking elements including a light-transparent portion individually shaped to designate a particular wave-signal frequency-channel corresponding to a given operating condition of said tuning device; means for mechanically linking said tuning knob to said tuning device to effect adjustment of said tuning device in response to rotation of said knob; and a light source mounted within said cabinet and positioned to project light through a selected one of said light transparent portions to form an image thereof on said translucent screen area.

5. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section, affixed to the opposite end of said body section, comprising a plurality of lenses arranged in a predetermined pattern about the central axis of said body section and a masking structure including a corresponding plurality of light-transparent portions individually aligned with said lenses and individually shaped to designate a particular wave-signal frequency-channel corresponding to a given operating condition of said tuning device; means for mechanically linking said tuning knob to said tuning device to effect adjustment of said tuning device in response to rotation of said knob; and a light source mounted with said cabinet and positioned to project light through a selected one of said light transparent portions to form an image thereof on said translucent screen area.

6. A frequency-channel indicator for a wave-signal receiver including a cabinet and a frequency-selective tuning device, said indicator comprising: a tuning knob including a hollow, substantially cylindrical body section; a first closure section affixed to one end of said body section and including a translucent screen area; a second closure section, affixed to the opposite end of said body section comprising a plurality of pairs of concave lenses arranged in a predetermined pattern about the central axis of said body section and a masking structure including a corresponding plurality of light-transparent portions individually aligned with said pairs of lenses and individually shaped to designate a particular wave-signal frequency-channel corresponding to a given operating condition of said tuning device; means for mechanically linking said tuning knob to said tuning device to effect adjustment of said tuning device in response to rotation of said knob; and a light source mounted within said cabinet and positioned to project light through a selected one of said light transparent portions to form an image thereof on said translucent screen area.

References Cited in the file of this patent

UNITED STATES PATENTS

| Number | Name | Date |
|---|---|---|
| 2,090,086 | Weiner | Aug. 17, 1937 |
| 2,334,479 | Creager | Nov. 16, 1943 |
| 2,619,932 | Brewster | Dec. 2, 1952 |